June 24, 1958 W. A. GUSS ET AL 2,840,367
SELF-ALIGNING BEARING
Filed Aug. 4, 1953
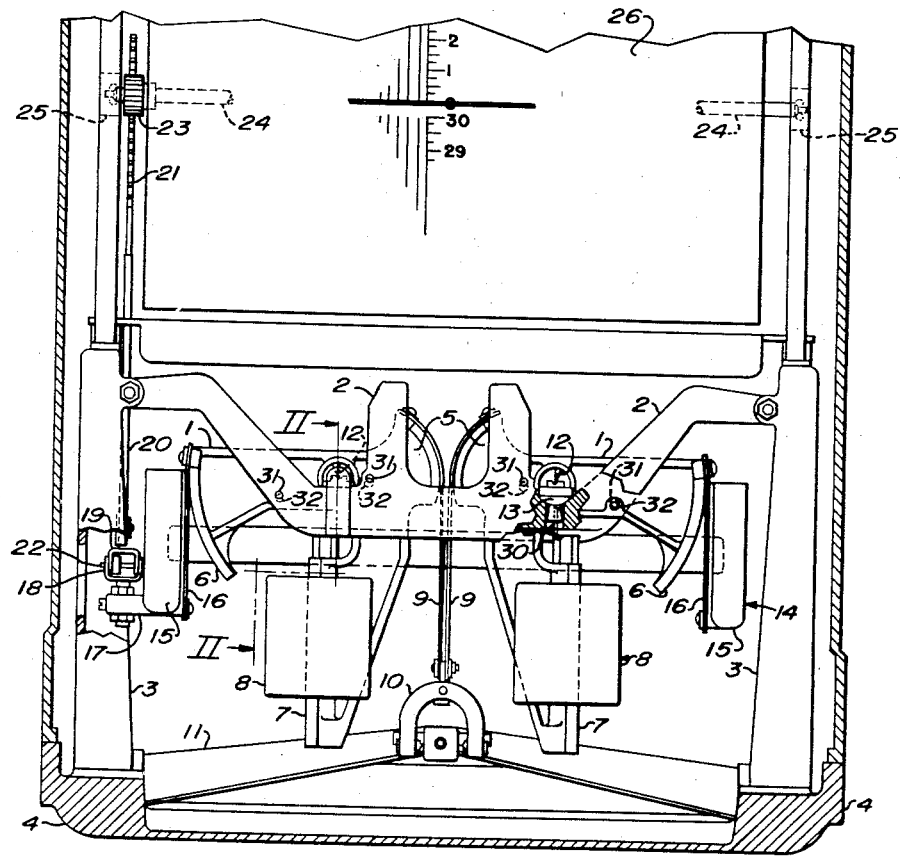
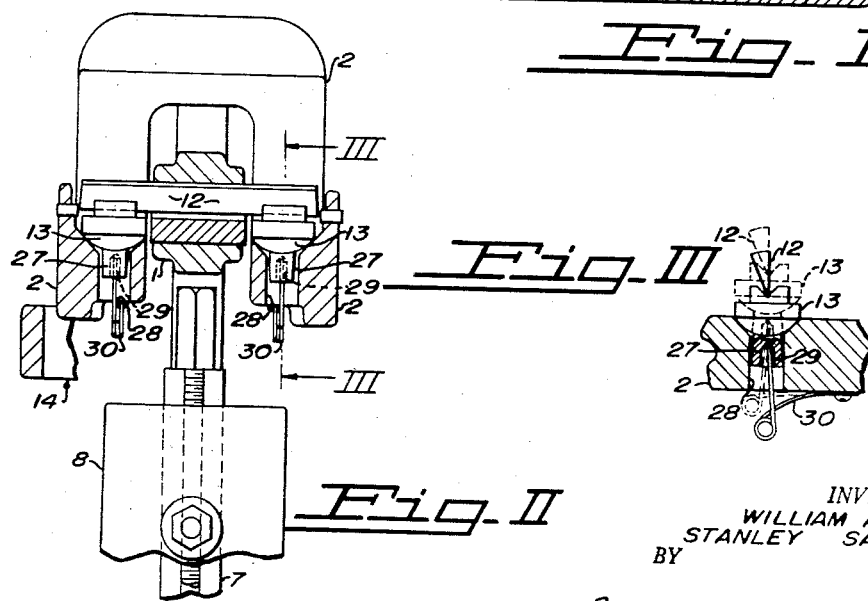
INVENTORS
WILLIAM A. GUSS
STANLEY SANKOVICH
BY
Marshall, Marshall & Husting
ATTORNEYS United States Patent Office 2,840,367
Patented June 24, 1958

2,840,367

SELF-ALIGNING BEARING

William A. Guss and Stanley Sankovich, Toledo, Ohio, assignors, by mesne assignments, to Toledo Scale Corporation, Toledo, Ohio, a corporation of Ohio Application August 4, 1953, Serial No. 372,332

4 Claims. (Cl. 265—27)

This invention relates to weighing scales, and in particular to means for maintaining cooperating knife-edge pivots and V-bearings in proper alignment at all times.

A weighing scale such as that shown in U. S. Patent 2,633,350 to Williams has knife-edge pivots and V-bearings which can be very easily damaged by jarring and bouncing during shipment of the scale. If damage is done to the precisely machined knife-edges, the weighing accuracy of the scale is greatly affected. To overcome the possibility of the pivots being damaged during transit from the factory to a sales agency, the members retaining the knife-edge pivots are translated in a direction whereby the load on the V-bearing is relieved. The members are then locked in that position. Upon arrival at the sales agency, a serviceman unlocks the members and puts the scale into operative condition.

Generally speaking, scales of this type are demonstrated by a salesman at the store of a merchant who is a prospective customer. This means that the salesman must transport the scale by automobile or truck to the merchant's store. The same danger of damaging the pivots during shipping from the factory to the agency is present during transporting the scale from the agency to the store where it is to be demonstrated. It is therefore desirable to provide means whereby a salesman may lock the weighing mechanism in a position in which the load on the V-bearing is relieved during transportation. Additionally, it is desirable that such locking take place without necessitating removal of the housing of the scale or adjustment of any of its parts.

A method was devised in which such locking could be effected from the exterior of a scale housing, but use of this method created additional problems. It was found that the knife edges and V-bearings which were separated when the parts were in locked position would become misaligned. When unlocked and restored to operative position, the knife-edges didn't properly reseat in the V-bearings and consequently the weighing accuracy of the scale was adversely affected. The manner in which a V-bearing is seated permits it to rotate about its vertical axis when the knife-edge is disengaged from it. By moving the knife-edge out of engagement with the V-bearing while shipping the scale from the agency to the merchant's store, the V-bearing and knife-edge could become misaligned. When the weighing mechanism was later unlocked, the knife-edge might seat crosswise of the V-bearing if they were out of alignment or might enter the V-bearing in such a manner as to hang up on the sharp edges of the V at the ends thereof.

The principal object of this invention is to maintain a knife-edge pivot and its cooperating V-bearing in proper alignment.

Another object of the invention is to urge the V-bearing to remain in contact with the knife-edge when the knife-edge is moved to a position whereby the load on the V-bearing is relieved.

A further object of the invention is to eliminate the necessity of removing portions of the weighing scale housing in order to gain access to and properly align a knife-edge and V-bearing which may have become misaligned.

More specifically, the object of the invention is to provide resilient means for retaining a knife-edge and V-bearing in engagement whenever the knife-edge is translated in a direction to relieve the load transmitted through the knife-edge to the V-bearing.

Other objects and advantages will be apparent from the following description in which references are had to the accompanying drawing.

In the drawing:

Figure I is a view in elevation of a weighing scale embodying the invention, parts being shown in section.

Figure II is a fragmentary elevational view taken substantially along lines II—II of Figure I with parts shown in section.

Figure III is a view taken substantially along lines III—III of Figure II illustrating the manner in which the V-bearing is resiliently raised from its seat when the knife-edge is translated to relieve the load on the V-bearing.

These specific figures and the accompanying description are intended merely to illustrate the invention but not to limit its scope.

Referring to Figure I, a pair of pendulum bodies 1 are pivotally supported from a bridge 2 which is horizontally disposed between a pair of uprights 3 mounted from the base 4 of the weighing scale. Each pendulum body 1 comprises an arcuate power sector 5, an auxiliary sector 6 and a rectilinear track 7 on which an adjustable pendulum weight 8 is mounted. A pair of thin metallic ribbons 9 overlie the arcuate faces of the power sectors 5 and are connected to a stirrup 10 which is pivotally connected to a weighing lever 11.

As a load is placed on the load receiver (not shown) of the weighing scale, the lever 11 moves downwardly and creates a downward pull through the ribbons 9. This causes the pendulum bodies 1 to pivot and swing the pendulum weights 8 outwardly and upwardly to aid in counterbalancing the load placed on the load receiver. The pendulum bodies 1 are pivotally mounted by knife-edge pivots 12 resting in V-bearings 13 that are seated in an underslung portion of the bridge 2 spanning the space between the uprights 3 erected from the base 4.

A loading frame 14 constituting a suspended mass comprises a pair of hollow receptacles 15 juxtaposed to the auxiliary sectors 6. The frame is suspended from the pendulum bodies 1 by means of pairs of metallic ribbons 16 that are attached near the bottom of the sides of the receptacles 15 and extend upwardly along the sides of the receptacles and at their upper ends overlie and are attached to the concentric auxiliary sectors 6 of the pendulum bodies 1.

One of the receptacles 15 has a laterally extending lug 17 on which a yoke 18 is adjustably mounted. A smaller yoke 19 secured to the bottom of a rod 20 that carries a rack 21 is pivotally mounted in the first yoke 18 by means of a pin 22. As the pendulum bodies 1 pivot in response to a load placed on the load receiver, the loading frame 14 moves upwardly causing a similar movement in the rod 20 and rack 21. The rack 21 meshes with a pinion 23 fixed to one end of a chart shaft 24 rotatably mounted in anti-friction bearings 25. A cylindrical chart 26 is carried on the chart shaft 24 and rotates through an arc corresponding to the distance through which the rack 21 moves to present indicia on the chart 26 in position for viewing in the usual manner.

Referring to Figure II, the knife-edge pivots 12 are fixed with respect to the pendulum bodies 1 and support the bodies from the V-bearings 13. The V-bearings 13 are each formed with a semi-spherical underside which rests in a counter sunk seat of the bridge 2. A downwardly extending shank 27 of each V-bearing 13 projects into a cylindrical opening 28 coaxial with the countersunk seat. A hole 29 is drilled upwardly into the shank 27 of each of the bearings 13 and is provided with a generally conical bottom. Extending into each hole 29 is a spring member 30 which has one end attached to the underside of the bridge 2. The extended end of each spring cooperates with the conical bottom of its corresponding holes 29 to permit substantial universal movement of the V-bearing about the spring member 30.

The spring members 30 are designed to lift the V-bearings 13 from their seats whenever the knife-edge pivots 12 are raised, so as to maintain the V-bearings 13 in engagement with the knife-edge pivots 12. By maintaining the cooperating knife-edges and V-bearings in engagement whenever the knife-edges are raised from the V-bearings, the possibility of misalignment when the V-bearings are reseated in operative position is eliminated. Formerly, whenever the knife-edges were raised and the V-bearings remained in their seats, the V-bearings were able to rotate and become misaligned with the knife-edges.

It is possible to lock the pendulum bodies 1 in any of several manners with the knife-edges 12 having the load relieved from the V-bearing. For purposes of illustration, the locking for shipping may take place as follows. Referring again to Figure I, a plurality of holes 31 pass through each side of the bridge 2. Corresponding holes 32 are provided in the pendulum bodies 1. The axes of the holes 32 are slightly below the axes of the holes 31 when the pendulum bodies 1 are in operative position in the weighing scale. The pendulum bodies 1 may be raised so as to relieve the load transmitted through the knife-edges 12 to the V-bearings 13 by inserting into the holes 31, conical-pointed pins (not shown) through inspection openings in the housing of the weighing scale. The points of these pins enter into the corresponding holes 32 in the pendulum bodies 1, and since these holes 32 are below the axis of the holes 31, the conical-points cam the pendulum bodies 1 upwardly. Two pins are provided for each pendulum body 1, and when lockingly inserted, lock the pendulum bodies 1 and prevent any movement thereof. The locking can easily be accomplished by a salesman who is transporting the scale for delivery to a merchant. Upon delivery, the salesman can merely withdraw the pins from the holes 31 and 32. The shank portions 27 of the V-bearings 13 then guide the V-bearings back into their seat in operative position. There is no necessity to remove the weighing scale housing to properly align the knife-edges and pivots, since they are prevented from becoming misaligned.

As shown in Figures II and III, the shank 27 of each bearing 13 is crimped at its bottom so that only the edges transverse of the V-groove of the bearing engage with the sides of the cylindrical openings 28. This is done to permit the bearings to adjust themselves easily to the pivots while preventing shifting of the bearings transverse to the axis of the pivots. In Figure III the spring member 30 is shown in two different positions. As shown in solid lines, the spring member 30 is urged downwardly whenever the V-bearing 13 is seated properly in the bridge 2 and a load is transmitted to the bearing through the knife-edge. Whenever the knife-edge pivot 12 is moved upwardly however, the spring member 30 urges the V-bearing 13 upwardly to maintain it in contact with the knife-edge and is shown in such position in dotted lines.

Numerous methods of accomplishing the principal object of the invention are possible. The embodiment of the invention herein shown and described is to be regarded as illustrative only and it is to be understood that the invention is susceptible to variation, modification, and change within the spirit and scope of the subjoined claims.

Having described the invention, we claim:

1. In a pivotal connection, in combination, a knife-edge, a V-bearing cooperating with the knife-edge, the V-bearing comprising a shank having an opening on the bottom and along the longitudinal axis of the shank, a frame, a seat in the frame into which the shank of the V-bearing extends, the shank being engageable with the sides of the seat transverse to the V-groove of the bearing to prevent shifting of the bearing transverse to the axis of the knife-edge, a member carrying the knife-edge and pivotally supported by the knife-edge on the V-bearing, the member being translatable in a direction to relieve the load on the V-bearing, and resilient means cooperating with the opening in the shank to permit substantial universal movement of the V-bearing about the resilient means and for urging the V-bearing from its seat when the member is so translated to maintain the V-bearing in contact with the knife-edge.

2. In a pivotal connection, in combination, a knife-edge, a V-bearing cooperating with the knife-edge, the V-bearing comprising a shank having a conical bottomed opening on the bottom and along the longitudinal axis of the shank and a crimped bottom portion on the shank, a frame, a seat in the frame into which the shank of the V-bearing extends, the crimped bottom portion of the shank engaging the sides of the seat transverse to the V-groove of the bearing to prevent shifting of the bearing transverse to the axis of the knife-edge, a member carrying the knife-edge and pivotally supported by the knife-edge on the V-bearing, the member being translatable in a direction to relieve the load on the V-bearing, and a spring attached to the frame and having an end cooperating with the opening in the shank to permit substantial universal movement of the V-bearing about the spring and for urging the V-bearing from its seat when the member is so translated to maintain the V-bearing in contact with the knife-edge.

3. In a weighing scale having a frame and weighing mechanism enclosed within a housing, in combination, a V-bearing seated in the frame, a cooperating knife-edge carried by a portion of the weighing mechanism to pivotally support that portion of the weighing mechanism by the knife-edge from the V-bearing, means for lifting from the exterior of the housing said portion of the weighing mechanism whereby the load on the knife-edge is relieved, the lifting means being adapted to lock said portion in a position in which the load is relieved, and means for automatically urging the V-bearing to remain in contact with the knife-edge when the portion of the weighing mechanism is so lifted and locked, the means for urging permitting substantial universal movement of the V-bearing about the means for urging.

4. A device according to claim 3 including means on the V-bearing for guiding and for properly reseating the V-bearing when the portion of the weighing mechanism is unlocked and a load is again applied to the V-bearing.

References Cited in the file of this patent

UNITED STATES PATENTS

| 856,007 | Wehnstrom | June 4, 1907 |
| 889,217 | Finch | June 2, 1908 |
| 1,295,967 | Buckingham | Mar. 4, 1919 |
| 1,470,665 | Chapman | Oct. 16, 1923 |
| 2,396,462 | Grace et al. | Mar. 12, 1946 |
| 2,584,873 | Hart et al. | Feb. 5, 1952 |
| 2,611,663 | Foster | Sept. 23, 1952 |
| 2,633,350 | Williams | Mar. 31, 1953 |

FOREIGN PATENTS

| 667,605 | France | June 17, 1929 |
| 939,386 | France | Apr. 19, 1948 |
| 984,083 | France | Feb. 21, 1951 |
| 1,004,754 | France | Nov. 28, 1951 |
| 847,660 | Germany | Aug. 25, 1952 |
| 865,543 | Germany | Feb. 2, 1953 |